United States Patent
Jung et al.

(10) Patent No.: US 7,869,694 B2
(45) Date of Patent: Jan. 11, 2011

(54) METHOD OF PROVIDING RECORDABLE TIME ACCORDING TO REMAINING MEMORY CAPACITY AND TERMINAL THEREFOR

(75) Inventors: Jae-Young Jung, Suwon-si (KR); Jeong-Min You, Suwon-si (KR); Byung-Wook Kim, Suwon-si (KR); Young-Sik Lee, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1244 days.

(21) Appl. No.: 11/452,704

(22) Filed: Jun. 14, 2006

(65) Prior Publication Data

US 2007/0031126 A1   Feb. 8, 2007

(30) Foreign Application Priority Data

Jul. 8, 2005   (KR) .................. 10-2005-0061639

(51) Int. Cl.
*H04N 7/26* (2006.01)
(52) U.S. Cl. .................. 386/124; 386/83; 386/46; 725/151
(58) Field of Classification Search .................. 386/46, 386/83, 124; 725/151
See application file for complete search history.

(56) References Cited

U.S. PATENT DOCUMENTS

| | | |
|---|---|---|
| 5,950,164 A | 9/1999 | Takahashi |
| 6,584,272 B1 * | 6/2003 | Fukushima et al. ........... 386/46 |
| 2002/0094191 A1 | 7/2002 | Horie et al. |
| 2004/0028377 A1 | 2/2004 | Inakura |

FOREIGN PATENT DOCUMENTS

| | | |
|---|---|---|
| CN | 1397075 | 2/2003 |
| EP | 0 828 251 | 3/1998 |
| EP | 1 168 347 | 1/2002 |
| EP | 1 443 511 | 8/2004 |
| JP | 2005-057700 | 3/2005 |
| JP | 2005-101991 | 4/2005 |

\* cited by examiner

*Primary Examiner*—Thai Tran
*Assistant Examiner*—Girumsew Wendmagegn
(74) *Attorney, Agent, or Firm*—The Farrell Law Firm, LLP (57) ABSTRACT

Provided is a function of providing a recordable time considering remaining memory capacity. To implement this function, an average reception rate of broadcasting data received for a predetermined time (e.g., several seconds) is calculated, and the recordable time is calculated using the calculated average reception rate and the remaining memory capacity. By doing this, even if the amount of broadcasting data to be recorded varies according to broadcasting programs, the amount of broadcasting data to be recorded can be predicted, and thereby, a user can efficiently record a desired broadcasting portion by actively determining whether the broadcasting is recorded.

12 Claims, 7 Drawing Sheets

| vRate [0] | 58,321 |
|---|---|
| vRate [1] | 63,284 |
| vRate [2] | 60,939 |
| vRate [3] | 48,253 |
| vRate [4] | 42,038 |
| vRate [5] | 58,321 |
| vRate [6] | 55,342 |
| vRate [7] | 53,254 |
| vRate [8] | 51,331 |
| vRate [9] | 75,234 |

(b)

| aRate [0] | 5,321 |
|---|---|
| aRate [1] | 6,284 |
| aRate [2] | 6,939 |
| aRate [3] | 4,253 |
| aRate [4] | 4,038 |
| aRate [5] | 3,299 |
| aRate [6] | 5,342 |
| aRate [7] | 3,254 |
| aRate [8] | 4,331 |
| aRate [9] | 5,234 |

(c)

| VBRATE | 56,227 |
|---|---|

(d)

| ABRATE | 5,135 |
|---|---|

(e)

| upIndex | 5 |
|---|---|

FIG.7

METHOD OF PROVIDING RECORDABLE TIME ACCORDING TO REMAINING MEMORY CAPACITY AND TERMINAL THEREFOR

PRIORITY

This application claims priority under 35 U.S.C. §119 to an application entitled "Method of Providing Recordable Time According to Remaining Memory Capacity and Terminal therefore" filed in the Korean Intellectual Property Office on Jul. 8, 2005 and assigned Serial No. 2005-61639, the contents of which are incorporated herein by reference.

BACKGROUND OF THE INVENTION

1. Field of the Invention

The present invention relates generally to a digital multimedia broadcasting (DMB) receiving terminal, and in particular, to a method of providing a recordable time according to remaining memory capacity when recording digital broadcasting and a terminal therefore.

2. Description of the Related Art

In general, digital broadcasting is a broadcasting service for providing a high resolution, high sound quality, and a better service to users by replacing conventional analog broadcasting. Recently, accompanying the development of digital broadcasting technology and mobile communication technology, people have been greatly interested in a digital broadcasting service to watch digital broadcasting even while moving. In particular, people have been greatly interested in a digital multimedia broadcasting (DMB) service using a mobile terminal.

A terminal having a DMB function provides a recording function by which broadcasting can be recorded while watching the broadcasting. Thus, a user can store desired broadcasting data if necessary using the terminal. A method of recording broadcasting to store digital broadcasting data desired by the user is almost the same as a method of recording conventional broadcasting using an analog signal. For example, there is a method of storing digital broadcasting data by setting reserved recording in advance or by a user directly controlling a storage device.

As described above, in a method of recording broadcasting by a user pressing a specific key among the conventional broadcasting recording methods, if there remains some memory capacity, a terminal starts to perform a storing process, and when there exists no more memory space, the terminal forcibly ends the storing process. Accordingly, scenes desired by the user may not be recorded. Likewise, since the user cannot know how much recordable time remains, when the user wants to store important scenes or set reserved recording, the user cannot help but manually determine when the recording starts and ends and approximately perform the recording.

As described above, in order for a conventional terminal having the DMB function to store broadcasting data, it must include a high-performance multimedia module. Furthermore, it is limited to store broadcasting data desired by a user due to a memory having limited capacity. In addition, although the user can determine remaining memory capacity, since the amount of broadcasting data to be stored varies according to broadcasting programs in reality, the user cannot determine remaining recordable time. That is, for the user to record desired broadcasting the user cannot help but determine whether the recording starts by predicting whether the broadcasting can be fully recorded.

SUMMARY OF THE INVENTION

An object of the present invention is to substantially solve at least the above problems and/or disadvantages and to provide at least the advantages below. Accordingly, an object of the present invention is to provide a method of providing a recordable time according to remaining memory capacity, by which whether recording starts can be determined by actively informing a user how much recordable time remains, and a terminal therefore.

Another object of the present invention is to provide a method of providing a recordable time according to remaining memory capacity, by which a recordable time considering the remaining memory capacity can be calculated even if the amount of broadcasting data to be recorded per broadcasting program is different, and a terminal therefore.

According to one aspect of the present invention, there is provided a method of providing a recordable time according to remaining memory capacity in a digital multimedia broadcasting (DMB) receiving terminal. The method includes performing a broadcasting service mode by receiving broadcasting data; determining whether a recording request is input by a user while performing the broadcasting service mode; calculating remaining memory capacity and a recordable time if a recording request is input; and displaying the calculated remaining memory capacity and recordable time.

According to another aspect of the present invention, there is provided a digital multimedia broadcasting (DMB) receiving terminal providing a recordable time according to remaining memory capacity, the terminal having an audio decoder for receiving an audio frame according to the DMB broadcasting, audio decoding the received audio frame, and outputting the decoded audio frame; a video decoder for receiving a video frame according to the DMB broadcasting, video decoding the received video frame, and outputting the decoded video frame; an average reception rate calculator for storing the total size of the audio frame and video frame input from the audio decoder and the video decoder per unit time for a predetermined time, calculating an average reception rate of the DMB broadcasting data for the predetermined time, and calculating a recordable time considering remaining memory capacity using the average reception rate; and a controller for outputting the recordable time calculated by the average reception rate calculator when a recording request is input by a user.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Preferred embodiments of the present invention will be described herein below with reference to the accompanying drawings. In the drawings, the same or similar elements are denoted by the same reference numerals even though they are depicted in different drawings. In the following description, well-known functions or constructions are not described in detail since they would obscure the invention in unnecessary detail.

The present invention implements a function of providing a recordable time considering remaining memory capacity. To do this, the present invention calculates an average reception rate of broadcasting data received for a predetermined time (e.g., several seconds) and calculates the recordable time using the calculated average reception rate and the remaining memory capacity. By doing this, even if the amount of broadcasting data to be recorded varies according to broadcasting programs, the amount of broadcasting data to be stored can be predicted, and thus, a user can efficiently record desired broadcasting by actively determining whether the broadcasting is recorded.

Figure 1:
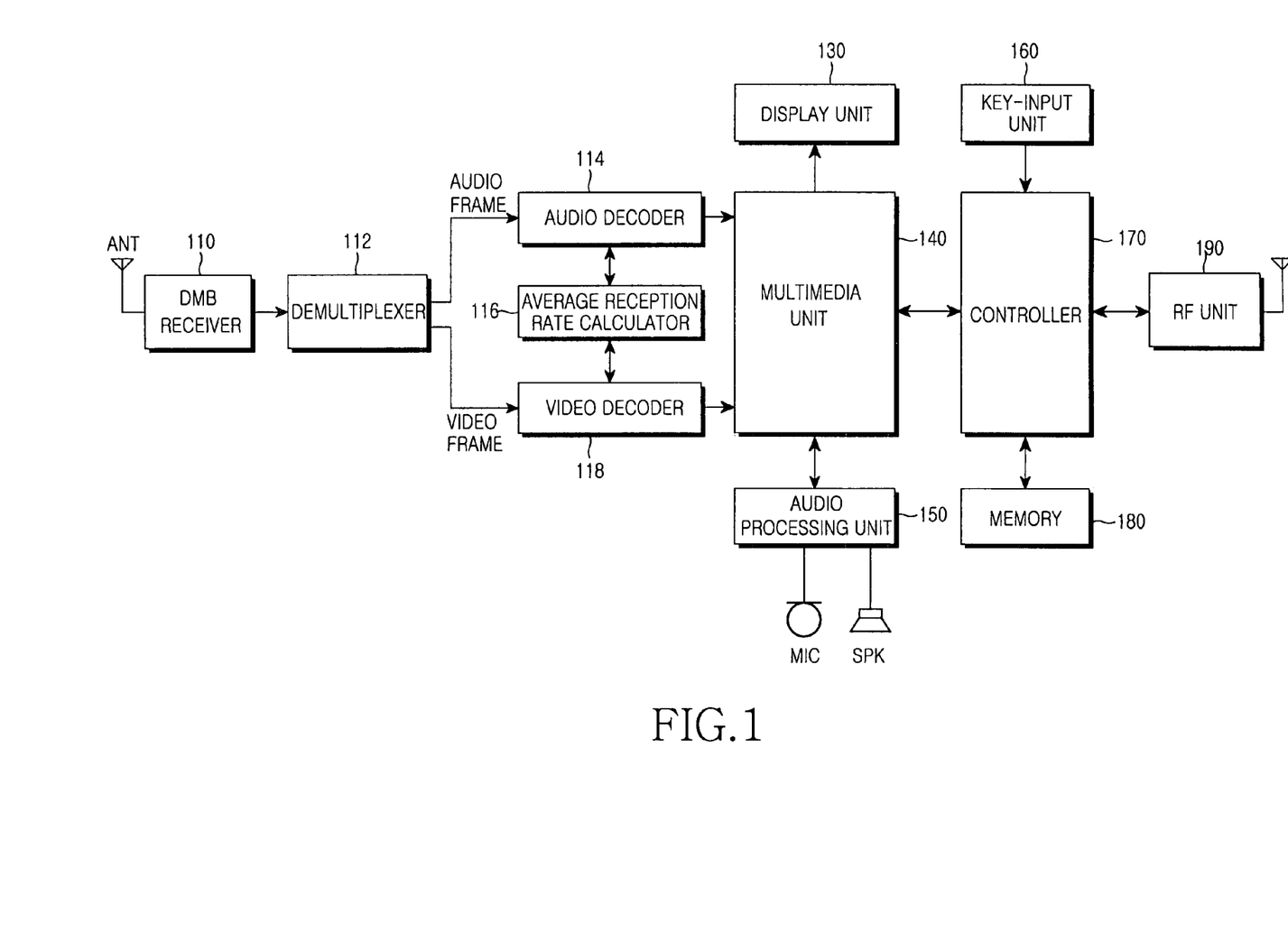
FIG. 1 is a block diagram of a DMB receiving terminal according to the present invention.

Components of a DMB receiving terminal having the function described above and their operations will now be described with reference to FIG. 1. FIG. 1 is a block diagram of a DMB receiving terminal according to the present invention.

Referring to FIG. 1, the DMB receiving terminal includes a digital broadcasting data receiver 110, which receives broadcasting data through an antenna and outputs a transmission stream (TS) packet, a demultiplexer 112, which inputs the transmission stream packet from the digital broadcasting data receiver 110 and constructs an audio frame and a video frame, an audio decoder 114, which receives the audio frame from the demultiplexer 112, audio decodes the received audio frame, and outputs the decoded audio frame to a multimedia unit 140, and a video decoder 118, which receives the video frame from the demultiplexer 112, video decodes the received video frame, and outputs the decoded video frame to the multimedia unit 140.

The broadcasting data received to the digital broadcasting data receiver 110 is transmitted as a radio frequency (RF) signal by a transmitter of an external digital broadcasting system (not shown) to be carried on a transmission channel by splitting audio and video data to fit a TS packet size, multiplexing the TS packets, and modulating the multiplexed TS packets.

When the decoded video and audio data is output to the multimedia unit 140, the multimedia unit 140 outputs the input video and audio data to a display unit 130 and an audio processing unit 150, respectively. That is, the multimedia unit 140 outputs the decoded audio data to the audio processing unit 150 to output a user recognizable audio signal and outputs the decoded video data to the display unit 130 to display user recognizable video.

The DMB receiving terminal also includes an average reception rate calculator 116 calculating an average reception rate of the broadcasting data, according to the present invention. The average reception rate calculator 116 is constructed to provide a recordable time according to remaining memory capacity when a recording request is input by a user while receiving broadcasting data. In detail, the average reception rate calculator 116 calculates an average reception rate of the broadcasting data with respect to the video frame and the audio frame for a predetermined time and calculates a recordable time by dividing remaining memory capacity by the average reception rate. As a result, the average reception rate calculator 116 calculates a recordable time and outputs the calculated recordable time to a controller 170 through the multimedia unit 140. The amount of broadcasting data to be stored can be predicted utilizing the above described method.

When a recording request is input by the user, the controller 170 displays the recordable time calculated by the average reception rate calculator 116 in an overlay or pop-up window format on the display unit 130 on which the video data is displayed. In so doing the controller 170 allows the user to easily know how much broadcasting can be recorded. The controller 170 informs the user of the recordable time, when the user inputs a request for recording and it simultaneously receives the video and audio data from the multimedia unit 140 and stores the received video and audio data in a memory 180. According to the present invention, the controller 170 may continuously receive a recordable time from the average reception rate calculator 116 and display the received recordable time on the display unit 130 together with video data in realtime while performing a recording operation.

The controller 170 controls the display unit 130 to input key-input data input from a key-input unit 160 and display data corresponding to the key-input data or visually inform the user of a state of setting or operating a function desired by the user. The controller 170 controls the display unit 130 to display a recordable time calculated in advance before recording starts so that the user can actively determine whether the recording starts. In another way, the controller 170 may control the display unit 130 to continuously update and display a recordable time calculated during recording.

The audio processing unit 150 is connected to a microphone MIC and a speaker SPK, converts the audio data input from the multimedia unit 140 to an audio signal and outputs the converted audio signal to the speaker SPK, and converts an audio signal input from the microphone MIC to audio data and outputs the converted audio data to the multimedia unit 140.

The key-input unit 160 is a device for interfacing with the user and outputs key-input data unique to each key-input. The key-input data output from the key-input unit 160 is input to the controller 170. The controller 170 detects what key-input corresponds to the input key-input data and performs an operation according to the detection result.

The memory 180 stores information regarding general functions of the DMB receiving terminal and information regarding the supply of a broadcasting service at the same time. The controller 170 also controls the memory 180 to store an average reception rate and video and audio data provided by the multimedia unit 140 when recording is requested.

The controller 170 controls an RF unit 190 to transmit and receive an RF signal to and from a base transceiver station (BTS) through an antenna.

Figure 2:
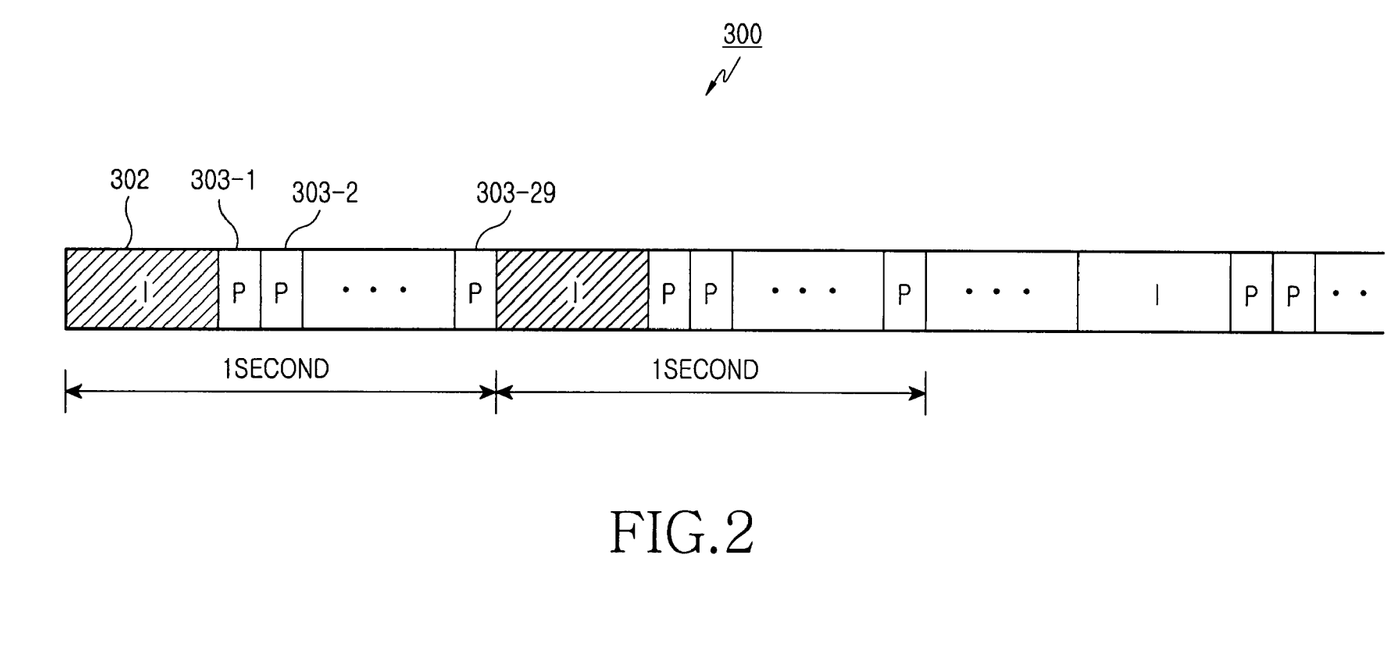
FIG. 2 is a schematic diagram of a video frame structure in DMB broadcasting according to the present invention.

An operation of the average reception rate calculator 116 will now be described with reference to FIG. 2. FIG. 2 is a schematic diagram of a video frame structure in DMB broadcasting according to the present invention. As illustrated in FIG. 2, a video frame 300 includes a single I frame 302 and 29 P frames 303-1 to 303-29 per second. Each of the I and P frames includes composition time stamp (CTS) information for synchronizing with an audio frame. An inter-CTS interval of each frame is fixed, for example, at 33 ms for terrestrial DMB (T-DMB). Thus, only if each frame is decoded and output within 33 ms, a decoding processing time of a subsequent frame is not affected, and accordingly, the synchronization with the audio frame can be smoothly performed. To obtain an average reception rate according to a preferred embodiment of the present invention, it is assumed that the DMB receiving terminal must exactly know CTSs and sizes of consecutively input I and P frames of the video frame 300 and continuously manage them.

A sequence of each frame is repeated every second, first an I frame and then 29 P frames in sequence. Thus, by summing a single I frame and 29 P frames, 30 FPS (frame per second), which is the number of frames of a vide frame of the T-DMB, is obtained. Thus, a reception rate of the video data can be obtained by summing the sizes of a single I frame and 29 P frames input in a second. The average reception rate calculator 116 transmits to the controller 170 an average reception rate obtained by continuously calculating a reception rate per second based on the above description, and then, the controller 170 stores the average reception rate in the memory 180 to maintain the calculated value.

Figure 3:
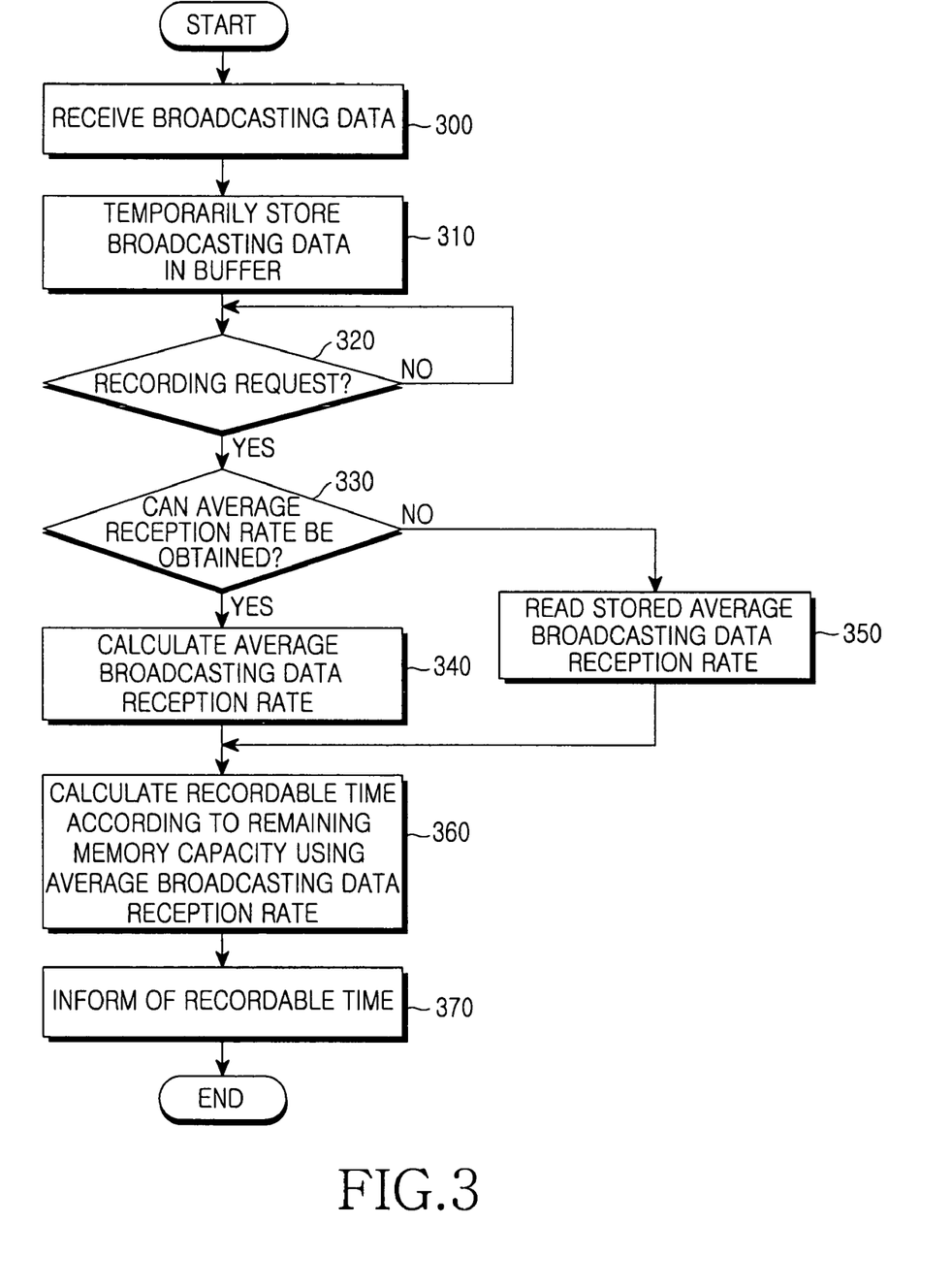
FIG. 3 is a flowchart of a method of providing a recordable time according to remaining memory capacity according to the present invention.

FIG. 3 is a flowchart of a method of providing a recordable time according to remaining memory capacity according to of the present invention.

Referring to FIG. 3, the DMB receiving terminal receives broadcasting data in step 300, and temporarily stores the received broadcasting data in step 310. In detail, when the DMB receiving terminal receives broadcasting through the digital broadcasting data receiver 110, the demultiplexer 112 constructs an audio frame and a video frame and transmits the audio frame and the video frame to the audio decoder 114 and the video decoder 118, and the audio frame and the video frame are stored in a predetermined buffer through the average reception rate calculator 116. A broadcasting data reception rate per unit time is also stored in the buffer. In step 320, the DMB receiving terminal determines whether a recording request is input by the user.

If it is determined that a recording request is input, in step 330, the DMB receiving terminal determines whether an average reception rate of broadcasting data can be calculated. If it is determined that the average reception rate of broadcasting data cannot be calculated, that is, if broadcasting data enough to calculate the average reception rate has not been stored in the buffer, the DMB receiving terminal reads from the memory 180 a stored average broadcasting data reception rate calculated when previous broadcasting data was received. Alternatively, the DMB receiving terminal may calculate an average reception rate of broadcasting data received until the current moment even if broadcasting data enough to calculate the average reception rate has not been stored in the buffer.

Since the amount of broadcasting data to be stored varies according to the contents of a broadcasting program, if the same average broadcasting data reception rate is used, an error according to the use of the same average broadcasting data reception rate can occur when a recordable time is predicted. Thus, to solve this problem, the previously stored average broadcasting data reception rate is used during a predetermined initial time, i.e., until broadcasting data enough to calculate the average reception rate is stored in the buffer. When enough broadcasting data to calculate the average reception rate is stored in the buffer, after the predetermined initial time, the average reception rate of broadcasting data can be calculated even if the amount of broadcasting data to be recorded per broadcasting program varies.

In the current embodiment, assuming that broadcasting data according to broadcasting programs is received without a significant variation for a certain time, the amount of broadcasting data to be stored is predicted using an average value of reception rates of broadcasting data received for a predetermined time.

If it is determined in step 330 that the average reception rate of broadcasting data can be calculated, that is, if broadcasting data enough to calculate the average reception rate has been stored in the buffer, the DMB receiving terminal calculates the average reception rate of broadcasting data in step 340. In detail, the average reception rate of broadcasting data received for the predetermined time is calculated using reception rates of broadcasting data stored in the buffer per unit time. For example, a broadcasting data reception rate per unit time is accumulated for the predetermined time, i.e., 10 seconds, and then, if the accumulated reception rate is divided by 10 seconds, an average reception rate of broadcasting data received for 10 seconds can be obtained.

In step 360, the DMB receiving terminal calculates a recordable time according to remaining memory capacity using the calculated average broadcasting data reception rate. Then, in step 370, the DMB receiving terminal informs the user of the recordable time. By doing this, the user can know how much broadcasting can be recorded and determine which portion of the broadcasting would be recorded.

Figure 4:
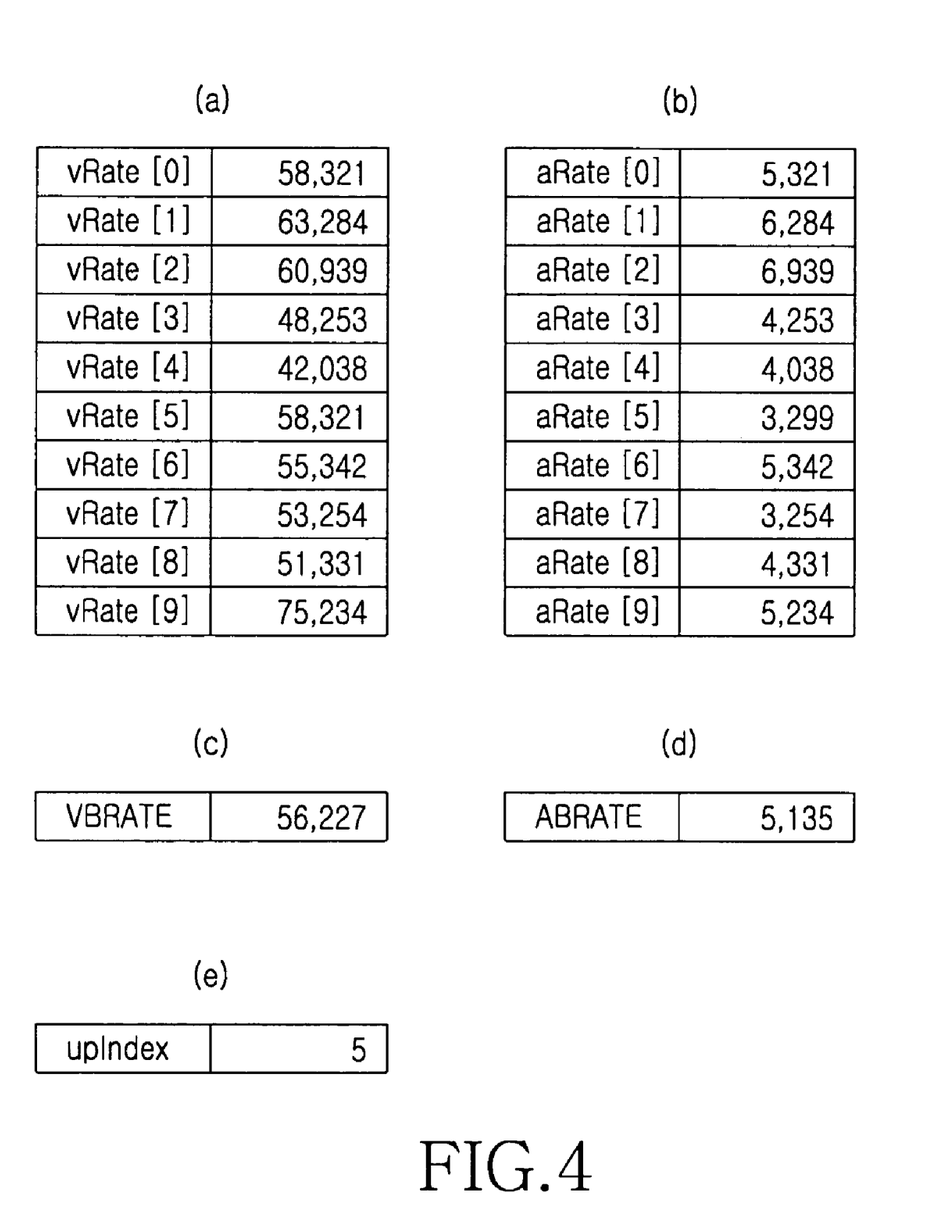
FIG. 4 illustrates arrays of video and audio data stored every second according to the present invention.
Figure 5:
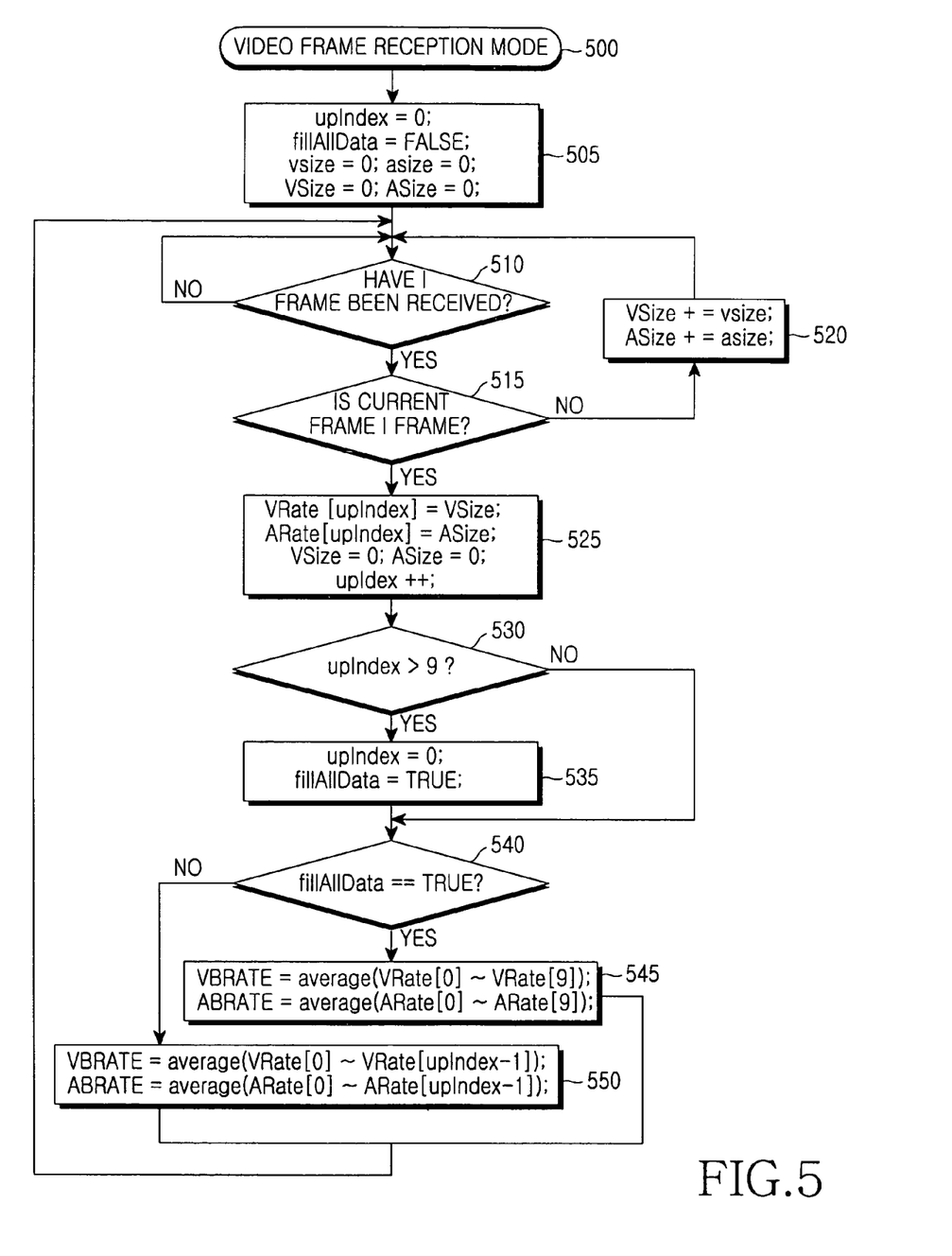
FIG. 5 is a flowchart of a method of storing audio and video data according to the present invention.

To describe the present invention in detail, hereinafter, a value obtained by averaging reception rates of broadcasting data received for 10 seconds is used as an example. FIG. 4 illustrates arrays of video and audio data stored every second according to the present invention. FIG. 5 is a flowchart of a method of storing audio and video data according to the present invention.

Referring to FIG. 4, reception rates of video data received every second are stored in an array vRate [upIndex] storing a bit rate of the video data per second. FIG. 4A illustrates a structure of the array vRate [upIndex] and values stored in the array vRate [upIndex]. Reception rates of audio data received every second are stored in an array aRate [upIndex] storing a bit rate of the audio data per second, and a structure of the array aRate [upIndex] is illustrated in FIG. 4B. As illustrated in FIGS. 4A and 4B, when 10 arrays are filled up for each of the array vRate [upIndex] and the array aRate [upIndex], Video Bit Rate (VBRATE) indicating an average reception rate of the video data and Audio Bit Rate (ABRATE) indicating an average reception rate of the audio data can be obtained as illustrated in FIGS. 4C and 4D. A value of upIndex illustrated in FIG. 4E increases by 1 every second, and 10 is a modulo value. In detail, the DMB receiving terminal stores a bit rate value per second at an upIndex location of each of the array vRate [upIndex] and the array aRate [upIndex], calculates VBRATE and ABRATE by averaging the stored bit rate values, respectively, and increases upIndex by 1. If VBRATE and ABRATE must be calculated before bit rate values are stored for 10 seconds, VBRATE and ABRATE can be obtained using some values stored in previous arrays.

Refer to FIG. 5 to describe a process of storing video data and audio data in detail.

When a mode in which a video frame is received is activated in step 500, that is, when a video frame starts to be received, the DMB receiving terminal initializes variables in step 505. In step 510, the DMB receiving terminal determines whether an I frame exists in the consecutively received video frame. If an I frame does not exist, the DMB receiving terminal waits until an I frame is detected. If an I frame is detected, the DMB receiving terminal determines in step 515 whether a current frame is an I frame. If the current frame is not an I frame, the DMB receiving terminal accumulates values of variables vsize and asize indicating the size of each of the existing I frame and all subsequent P frames with respect to video and audio data into variables VSize and ASize indicating total sizes in step 520. Through steps 510 to 520, sizes of all P frames between every I frames can be accumulated.

Since the video frame has a period of 1 second, an audio frame storage period follows the video frame storage period. If it is determined in step 515 that a current frame is an I frame while accumulating every values of vsize and asize into VSize and ASize, in step 525, the DMB receiving terminal stores values of VSize and ASize in relative upIndex locations of the arrays vRate [upIndex] and aRate [upIndex] and increases a value of upIndex by 1. Herein, upIndex is an index used to maintain data within latest 10 seconds, maintaining 10 as a moduled value.

If upIndex is greater than 9 in step 530, in step 535, the DMB receiving terminal initializes upIndex to 0 and sets a variable fillAllData for using an already stored average reception rate to 'TRUE.' If upIndex is not greater than 9 in step 530, it is determined in step 540 whether fillAllData is 'TRUE.' Since fillAllData indicates an initial storage state at the moment, fillAllData maintains 'FALSE.' Thus, in step 550, the variables VBRATE and ABRATE indicating average reception rates of the video and audio data are obtained using only currently stored array values even if 10 arrays are not filled up.

If is determined in step 540 that fillAllData is 'TRUE,' the variables VBRATE and ABRATE are obtained using array values stored for last 10 seconds.

Prior to the description of a process of obtaining a recordable time according to a preferred embodiment of the present invention, VBRATE and ABRATE, which are average values of data reception rates stored for last 10 seconds, will now be schematically described.

VBRATE indicates an average of total sizes of a video frame stored every 1 second, and is obtained as an average value BitRate for last 10 seconds for more accurate prediction. ABRATE indicates an average of total sizes of an audio frame stored every 1 second, and is obtained as an average value BitRate for last 10 seconds.

If an average reception rate of broadcasting data received for a predetermined time can be obtained using the process described above, a recordable time considering remaining memory capacity can be calculated. A method of calculating a recordable time considering remaining memory capacity using an average reception rate is achieved by dividing the remaining memory capacity by the size of data stored for 1 second according to a predetermined file format. A process of calculating a recordable time according to the present invention will now be described in detail.

For example, when broadcasting data, such as a moving picture, is stored in a file format such as skm, a recordable time considering remaining memory capacity can be calculated using Equation 1 as follows:

recordable time=[remaining memory capacity]/[size of *skm* file stored for 1 second]   (1)

In Equation 1, the remaining memory capacity can be known using an application of a file system, and the size of an skm file stored for 1 second can be calculated using the increment per second according to an skm file structure illustrated in Table 1. Although the skm file format is illustrated in Equation 1, it is preferable that the size of an skm file stored for 1 second can be replaced with the size of data stored for 1 second according to a predetermined file format.

TABEL 1

| | skm Format | Bytes |
|---|---|---|
| | ftyp = | 28 |
| + | mdat = | 8 + (sec * VBRATE) |
| + | mdat = | 8 + (sec * ABRATE) |
| + | moov = | 8 |
| + | mvhd = | 108 |
| + | udta = | 8 |
| + | trak = | 8 |
| + | tkhd = | 92 |
| + | mdia = | 8 |
| + | mdhd = | 32 |
| + | hdlr = | 37 |
| + | minf = | 8 |
| + | vmhd = | 20 |
| + | dinf = | 36 |
| + | stbl = | 8 |
| + | stsd = | 154 |
| + | stts = | 8 + (sec * VFPS * 8) |
| + | stsc = | 40 |
| + | stsz = | 20 + (sec * VFPS * 4) |
| + | stco = | 16 + (sec * 4) |
| + | trak = | 8 |
| + | tkhd = | 92 |
| + | mdia = | 8 |
| + | mdhd = | 32 |
| + | hdlr = | 37 |
| + | minf = | 8 |
| + | smhd = | 16 |
| + | dinf = | 36 |
| + | stbl = | 8 |
| + | stsd = | 103 |
| + | stts = | 8 + (sec * AFPS * 8) |
| + | stsc = | 40 |
| + | stsz = | 20 + (sec * AFPS * 4) |
| + | stco = | 16 + (sec * 4) |

+) =========================================
SIZE = 1087 + sec * (VBRATE + ABRATE + 12VFPS + 4 + 12AFPS + 4)

Table 1 indicates an skm file structure, wherein once a storage format is determined when a single file is formed, a header is fixed, and only an additional storage size per second increases. In Table 1, numbers located at a Bytes portion, VBRATE, ABRATE, VFPS, and AFPS are constant numbers, and sec denotes a time variable. Wherein VFPS stands for Video Frame Per Sec. indicating the number of video frames per second (TDMB 30), and AFPS stands for Audio Frame Per Sec. indicating the number of audio frames per second (TDMB 43).

The skm file size, i.e. SIZE, can be obtained by substituting a storage time for the time variable sec in the equation shown in the bottom of Table 1. The abbreviations used in the skm file format are described in Table 2.

TABLE 2

| | |
|---|---|
| ftyp | File Type Compatibility |
| mdat | Media Data |
| moov | Movie |
| mvhd | Movie Header |
| udta | User Data |
| trak | Track |
| tkhd | Track Header |
| mdia | Media |
| mdhd | Media Header |
| hdlr | Handler Reference |
| minf | Media Information |
| vmhd | Video Media Header |
| smhd | Sound Media Header |
| dinf | Data Information |
| dref | Data Reference |
| url | Data Entry URL |
| stbl | Sample Table |

TABLE 2-continued

| | |
|---|---|
| stsd | Sample Description |
| stts | Decoding Time to Sample |
| stss | Sync Sample |
| stsc | Sample to Chunk |
| stsz | Sample Size |
| stco | Chunk Offset(32-bit version) |

The recordable time obtained using Equation 1 can be obtained using Equation 2 as set forth below by using Table 1.

$$MEM = FILEHDR + sec*(VBRATE + ABRATE + 12VFPS + 12AFPS + 8) \quad (2)$$

Since a file corresponding to current remaining memory capacity obtained using Equation 2 can be stored more, SIZE of Equation 1 can be substituted with a variable MEM indicating remaining memory capacity in Equation 2. In addition, since the size of a header can vary according to a storage file format, the constant 1087 of Equation 1 can be substituted with a constant FILEHDR of Equation 2. Equation 3 as set forth below is obtained by rearranging Equation 2 based on the time variable sec.

$$sec = \frac{(MEM - FILEHDR)}{(VBRATE + ABRATE + 12VFPS + 12AFPS + 8)} \quad (3)$$

If a value of the remaining memory capacity MEM is substituted in Equation 3, a recordable time can be calculated in second unit. Thus, using the equations described above, a recordable time at the time a recording request is input by a user can be displayed in hour, minute, and second unit.

Figure 6:
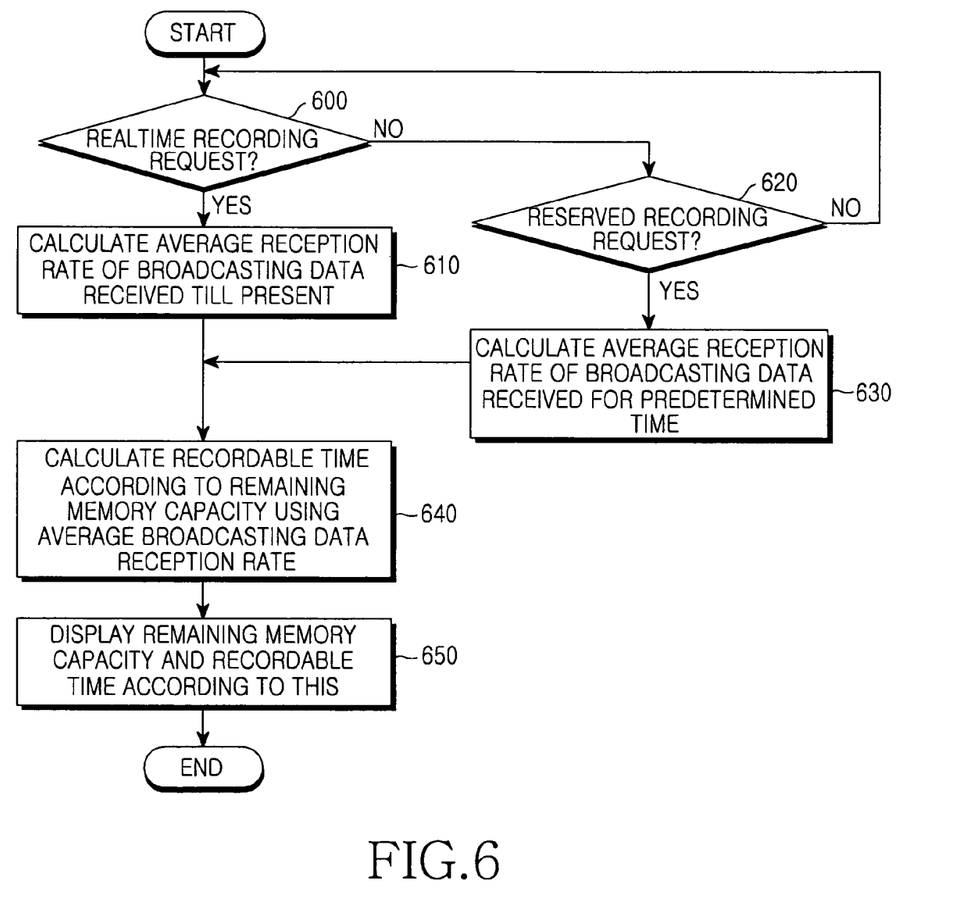
FIG. 6 is a flowchart of a method of displaying a recordable time according to remaining memory capacity according to the present invention.
Figure 7:
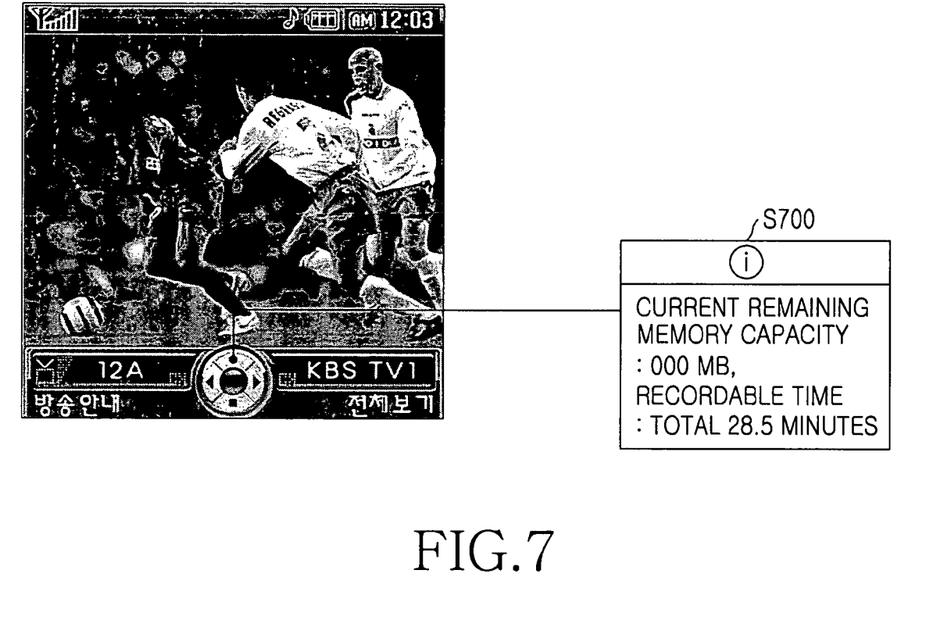
FIG. 7 illustrates a screen on which the recordable time of FIG. 6 is displayed.

To describe in detail a detailed example of displaying a recordable time according to the present invention, FIGS. 6 and 7 are referred to. FIG. 6 is a flowchart of a method of displaying a recordable time according to remaining memory capacity according to a preferred embodiment of the present invention, and FIG. 7 illustrates a screen on which the recordable time of FIG. 6 is displayed.

The DMB receiving terminal can provide a recording function in a broadcasting service mode of receiving broadcasting data and outputting a video and audio signal. Thus, a user can use a function of recording broadcasting data in realtime while watching broadcasting or a reserved recording function. In a recording function according to the present invention, when the realtime recording while watching broadcasting or the reserved recording is set, a function of informing the user of remaining memory capacity and a recordable time according to the remaining memory capacity is implemented.

This function will now be described with reference to FIG. 6. In the broadcasting service mode, the DMB receiving terminal determines in step 600 whether a recording request is input by a user. If a recording request is input as the determination result, the DMB receiving terminal calculates a current average broadcasting data reception rate using broadcasting data received until the present in step 610. In detail, when a realtime recording request is input, the DMB receiving terminal determines whether the DMB receiving terminal can calculate the average broadcasting data reception rate using the broadcasting data received until the present. That is, the DMB receiving terminal determines whether a predetermined time has passed to receive enough broadcasting data to calculate the average broadcasting data reception rate. If the predetermined time has not passed as the determination result, the DMB receiving terminal calculates a recordable time according to remaining memory capacity by calculating an average reception rate of broadcasting data received until the present instead of an average reception rate of broadcasting data received for the predetermined time. If the predetermined time has passed, it is preferable that the recordable time is calculated using an average reception rate of broadcasting data received for the predetermined time.

If it is determined in step 600 that the recording request input by the user is not a realtime recording request, the DMB receiving terminal determines in step 620 whether the recording request input by the user is a reserved recording request. If a reserved recording request is input as the determination result, the DMB receiving terminal calculates an average broadcasting data reception rate for the predetermined time using broadcasting data received for the predetermined time in step 630. Herein the average broadcasting data reception rate for the predetermined time denotes an average reception rate of broadcasting data received for several seconds, e.g., 10 seconds.

When such an average broadcasting data reception rate is calculated, the DMB receiving terminal calculates a recordable time according to remaining memory capacity using the average broadcasting data reception rate in step 640. Herein, the remaining memory capacity is a value obtained using Equation 1. When the remaining memory capacity and the recordable time are calculated through the above procedures, the DMB receiving terminal can display the calculated remaining memory capacity and recordable time as illustrated in FIG. 7.

Checking the remaining memory capacity and recordable time can be achieved by displaying the remaining memory capacity and recordable time on the screen when the user presses a key for realtime recording or reserved recording. Alternatively, checking the remaining memory capacity and recordable time can be achieved by overlaying them on the screen in a pop-up window pattern when the user selects a predetermined menu as indicated by reference character S700.

As described above, according to the present invention, by informing a user of a recordable time calculated by considering remaining memory capacity in advance before recording, the user can know how much broadcasting can be recorded, and accordingly, efficiency can be increased in the utilization of a recording function. That is, since the user can determine the recordable time before the recording starts, the user can actively select a recording range. In addition, a forcible recording stop in the middle of the recording due to a shortage of remaining memory capacity before normally ending the recording of an important scene can be prevented.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of providing a recordable time according to remaining memory capacity in a digital multimedia broadcasting (DMB) receiving terminal, the method comprising the steps of:
    performing a broadcasting service mode by receiving broadcasting data;
    determining whether a recording request is input by a user while performing the broadcasting service mode;

determining whether an average broadcasting data reception rate can be obtained using the received broadcasting data when the recording request input by the user is a realtime recording request;

calculating an average reception rate of broadcasting data received until the present if enough broadcasting data to the average broadcasting data reception rate has not been received as the determination result;

calculating remaining memory capacity and a recordable time if a recording request is input using the calculated average broadcasting data reception rate; and displaying the calculated remaining memory capacity and recordable time.

2. The method of claim 1, further comprising:

determining whether a predetermined menu key is input by the user to check the recordable time while performing the broadcasting service mode; and calculating and displaying the remaining memory capacity and recordable time if the predetermined menu key is input.

3. The method of claim 2, wherein the remaining memory capacity and recordable time can be displayed using a pop-up screen or overlay pattern on a screen on which a broadcasting image is displayed.

4. The method of claim 1, wherein the step of calculating the remaining memory capacity and recordable time comprises:

storing a broadcasting data reception rate per unit time;

calculating an average reception rate of broadcasting data received for a predetermined time using the broadcasting data reception rates;

calculating a recordable time considering remaining memory capacity using the average reception rate; and outputting the calculated recordable time.

5. The method of claim 4, wherein the step of storing the broadcasting data reception rate comprises:

decoding video and audio frames according to the DMB broadcasting when the video and audio frames are received and outputting the decoded video and audio frames; and obtaining the broadcasting data reception rate by summing the total sizes of a single I frame and 29 P frames received per second while outputting the decoded video and audio frames, and then storing the obtained broadcasting data reception rate per unit time.

6. The method of claim 4, wherein the step of calculating the average reception rate comprises:

accumulating the broadcasting data reception rate stored per unit time; and calculating the average reception rate by dividing the accumulated broadcasting data reception rate by the predetermined time.

7. The method of claim 1, wherein the recordable time is determined by:

recordable time=[remaining memory capacity]/[size of skm file stored for 1 second], wherein the remaining memory capacity is obtained using an application of a file system, and the size of an skm file stored for 1 second is obtained using the increment per second according to an skm file structure.

8. The method of claim 1, wherein the recordable time is calculated by dividing the remaining memory capacity by the size of a file stored per second according to a predetermined file format.

9. A digital multimedia broadcasting (DMB) receiving terminal providing a recordable time according to remaining memory capacity, the terminal comprising:

an audio decoder for receiving an audio frame according to the DMB broadcasting, audio decoding the received audio frame, and outputting the decoded audio frame;

a video decoder for receiving a video frame according to the DMB broadcasting, video decoding the received video frame, and outputting the decoded video frame;

an average reception rate calculator for storing the total size of the audio frame and video frame input from the audio decoder and the video decoder per unit time for a predetermined time, calculating an average reception rate of the DMB broadcasting data for the predetermined time, and calculating a recordable time considering remaining memory capacity using the average reception rate; and a controller for outputting the recordable time calculated by the average reception rate calculator when a recording request is input by a user, wherein the average reception rate calculator determines whether an average broadcasting data reception rate can be obtained using the received broadcasting data when the recording request input by the user is a realtime recording request, calculates an average reception rate of broadcasting data received until the present if enough broadcasting data to the average broadcasting data reception rate has not been received as the determination result.

10. The DMB receiving terminal of claim 9, further comprising:

a digital broadcasting receiver for providing a transmission stream packet received according to the DMB broadcasting;

a demultiplexer for receiving the transmission stream packet from the digital broadcasting receiver, constructing an audio frame and a video frame, and respectively transmitting the audio frame and the video frame to the audio decoder and the video decoder; and a display unit for displaying the recordable time under a control of the controller.

11. The DMB receiving terminal of claim 9, wherein the average reception rate calculator accumulates a reception rate of the broadcasting data stored per unit time, stores the accumulated reception rate, and calculates the average reception rate by dividing the accumulated reception rate by the predetermined time.

12. The DMB receiving terminal of claim 9, wherein the recordable time is obtained by dividing the remaining memory capacity obtained using an application of a file system by the size of a file stored per second according to a predetermined file format.

* * * * *